United States Patent

Daoud

[19]

[11] Patent Number: 6,065,975
[45] Date of Patent: May 23, 2000

[54] CONNECTOR SWITCHING MECHANISM

[75] Inventor: Bassel Hage Daoud, Parsippany, N.J.

[73] Assignee: Lucent Technologies Inc., Murray Hill, N.J.

[21] Appl. No.: 09/126,872

[22] Filed: Jul. 31, 1998

[51] Int. Cl.$^7$ ................................................. H01R 29/00
[52] U.S. Cl. ............................................. 439/49; 439/507
[58] Field of Search .......................... 439/49, 507–511, 439/532, 540.1; 379/327, 325, 326

[56] References Cited

U.S. PATENT DOCUMENTS

| | | | |
|---|---|---|---|
| 2,849,700 | 8/1958 | Pekin | 439/510 |
| 3,609,634 | 9/1971 | Hovnanian | 439/510 |
| 4,913,663 | 4/1990 | Siemon et al. | 439/509 |
| 5,711,681 | 1/1998 | Hasegawa | 439/510 |

*Primary Examiner*—Khiem Nguyen
*Assistant Examiner*—J. F. Duverne

[57] ABSTRACT

A connector block 6 for selectively routing wiring connections contains a first terminal strip 12, a second terminal strip 14, and a third terminal strip 16, which are disposed on the connector block 6. The first terminal strip 12 has a first wire receiving terminal 42 which is electrically connected to a first output connector 52. The second terminal strip 14 has a second wire receiving terminal 44 which is electrically connected to a second output connector 54. Similarly, the third terminal strip 16 has a third wire receiving terminal 46 which is electrically connected to a third output connector 56. The connector block 6 also contains a bridging device 22 which can be used for selectively connecting either the first output connector 52 or the third output connector 56 to the second output connector 54 thereby establishing an electrical connection between the second wire receiving terminal 44 and the selected output connector.

7 Claims, 3 Drawing Sheets

CONNECTOR SWITCHING MECHANISM

FIELD OF THE INVENTION

This invention relates generally to the field of telephone wire connectors and distribution systems, and specifically to a switching mechanism for selectively routing wiring connections on a connector block.

BACKGROUND OF INVENTION

Telephone lines, which are carried by electrical conductors known as tip ring wire pairs, are generally aggregated at a particular point in a building prior to being distributed and connected to various types of telephone equipment, such as, for example, telephones, fax machines, modems etc. As the tip ring pairs generally enter the building as part of a multi-conductor cable, the individual tip ring wire pairs must first be broken out from the cable into individual wire pairs. This is normally accomplished in a junction box known as, for example, a building entrance protector (BEP), or network interface unit (NIU). Within such devices the individual telephone line tip ring pairs are separated from the cable, individually connected to a connector block, and made available for further electrical connection and distribution. Usually there is a protector device inserted between the telephone and central office, or network side of the telephone line and the customer equipment or terminal side of the telephone line to protect the telephone and user, or other equipment connected to the telephone line, from hazardous overvoltages induced in the telephone network or in the cables passing between the telephone central office and the building within which the line is terminated.

In a typical arrangement, the telephone lines coming from the network are first wired to a protector field, which is an array of connectors for receiving the protector device, which is in turn hard wired to a first connector block which provides a first test point for testing the telephone line connections between the building and telephone central office. This first terminal block may be hard wired to a multi pair connector, most typically a twenty-five pair connector of the RJ21 type, for further connection to, for example, an array of customer bridges which are also hard wired and connectorized via a mating RJ21 connector. The use of a customer bridge permits a subscriber to disconnect terminal equipment from a telephone line so that the subscriber can isolate troubles on the line as originating in the telephone network, or on the terminal equipment side of the telephone line.

Additionally, there are known insulation displacement connector (IDC) blocks for use in such junction boxes and/or distribution fields, such as the ubiquitous punch down connector block, also known as a 66-type connector block. Generally, a 66-type connector block has one or more rows of two connectors dedicated to each tip or ring wire from the telephone central office. Each of these connectors can be electrically hard wired to provide telephone service to a different end user. The incoming tip or ring wire can be selectively routed to provide service to a different end user by connecting it to a specific connector. Generally, the connectors on a 66-type connector block comprise a terminal strip with an insulation displacement connector (IDC) at one end which receives the tip or ring wire from the telephone central office, usually through a protector field known in the art. Thus, a row of two adjacent connectors may be configured for the hard wired attachment of a tip or ring wire to the first connector in a row, with the second connector hard wired to an RJ21-type connector mounted near the connector block. To connect the first connector to the second, a bridging clip, known in the art, is used to connect the connectors at the IDC ends. If it is desired to connect the first connector elsewhere, the bridging clip is removed, and a wire is punched down on the IDC end of the first connector and routed to its desired endpoint, generally an alternate connector on the connector block, where it is punched down once more. This is an extremely labor-intensive operation which must be performed every time the desired output connector is changed. Thus, it is desirable to provide for an easier switching mechanism between output connectors without having to perform any actual wiring operations.

SUMMARY OF THE INVENTION

The present invention is directed at overcoming the shortcomings of the prior art. Generally speaking, in accordance with the present invention, a connector block for selectively routing wiring connections comprises a first terminal strip, a second terminal strip and a third terminal strip disposed on the connector block. The first terminal strip has a first wire receiving terminal which is electrically connected to a first output connector, the second terminal strip has a second wire receiving terminal which is electrically connected to a second output connector, and the third terminal strip has a third wire receiving terminal which is electrically connected to a third output connector. The connector block also has a bridging device which can be used for selectively connecting either the first output connector or the third output connector to the second output connector, thereby selectively establishing an electrical connection between the second wire receiving terminal and a selected output connector.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

BRIEF DESCRIPTION OF THE DRAWINGS

In the drawing figures, which are not to scale, and which are merely illustrative, and wherein like reference numerals depict like elements throughout the several views.

DETAILED DESCRIPTION OF THE PREFERRED EMBODIMENTS

Figure 1:
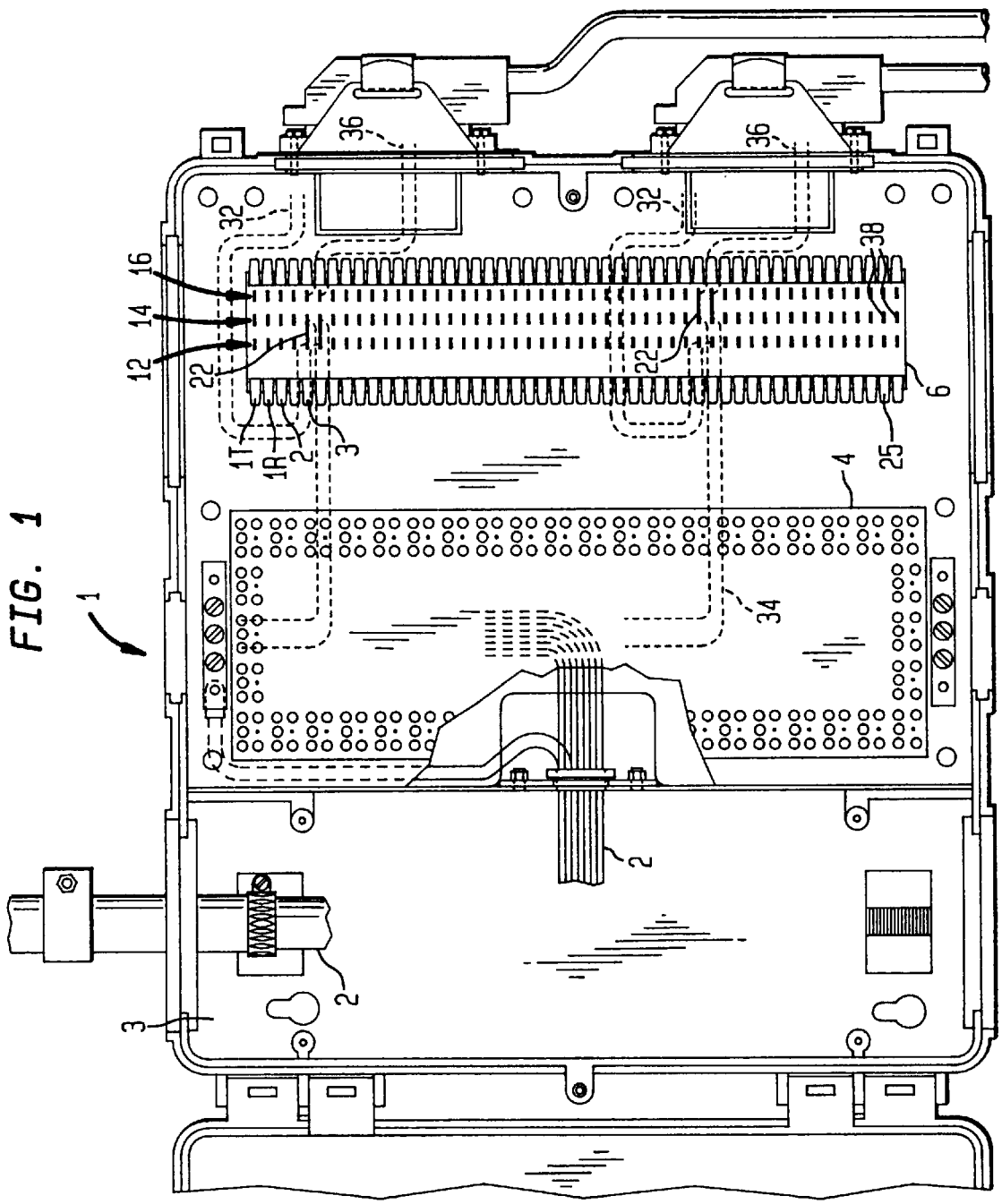
FIG. 1 is a front view of an embodiment of a selectively routed connector block in accordance with the present invention.

Reference is first made to FIG. 1, which illustrates a 66-type connector block 6, located within an enclosure generally indicated as 1. By way of non-limiting example, enclosure 1 can be a building entrance protector (BEP) or a network interface unit (NIU), or some other art recognized telephone wire junction box or backboard or surface mounted connector field, all of which terms are used interchangeably herein. Enclosure 1 consists of a splice chamber 3 of a type known in the art, for receiving a feeder cable 2 consisting of multiple pairs of electrical conductors, each pair representing the tip and ring leads of a telephone line coming from a telephone central office or other network facility. It is also possible for the invention to be utilized in private branch exchange (PBX) or centrex environments, with the lines being PBX lines or centrex lines or other network lines. Indeed, the skilled practitioner will recognize, from the teachings herein, the applicability of the present invention to myriad telephone distribution applications. Enclosure 1 may be fabricated of metal, plastic, synthetic resin or any combination thereof, or any other material suitable to the application in which the invention will be deployed, as a matter of design choice.

The individual differing wire pairs from feeder cable 2 are connected through input connectors or through direct wire terminations, in a manner known to the art, to a protector field 4. In a preferred embodiment, protector field 4 may contain a protector device for providing over voltage protection on the telephone line for each tip ring wire pair.

Connector block 6 has one row of terminal strips for each tip or ring wire from the telephone central office. As shown in FIG. 1, the first row, represented on the block by the label designation 1T, is dedicated to a tip wire. The corresponding ring wire is connected to the second row represented by the designation 1R in FIG. 1. Of course, such label designation are a matter of application specific design choice. Thus, the first two rows are dedicated to a first tip ring wire pair. Similarly, the next two rows are dedicated to the second tip ring wire pair, and so on.

Connector block 6 in FIG. 1 provides for 25 tip ring wire pairs, although the number of pairs included on a block is a matter of design choice. Each row of terminal strips in connector block 6 consists of a first terminal strip 12, a second terminal strip 14 and a third terminal strip 16 which are arranged in three columns. Thus, all the first terminal strips 12 of tip and ring rows 1–25 form the first column, all the second terminal strips 14 of tip and ring rows 1–25 form the second column and all the third terminal strips 16 of tip and ring rows 1–25 form the third column.

Figure 2:
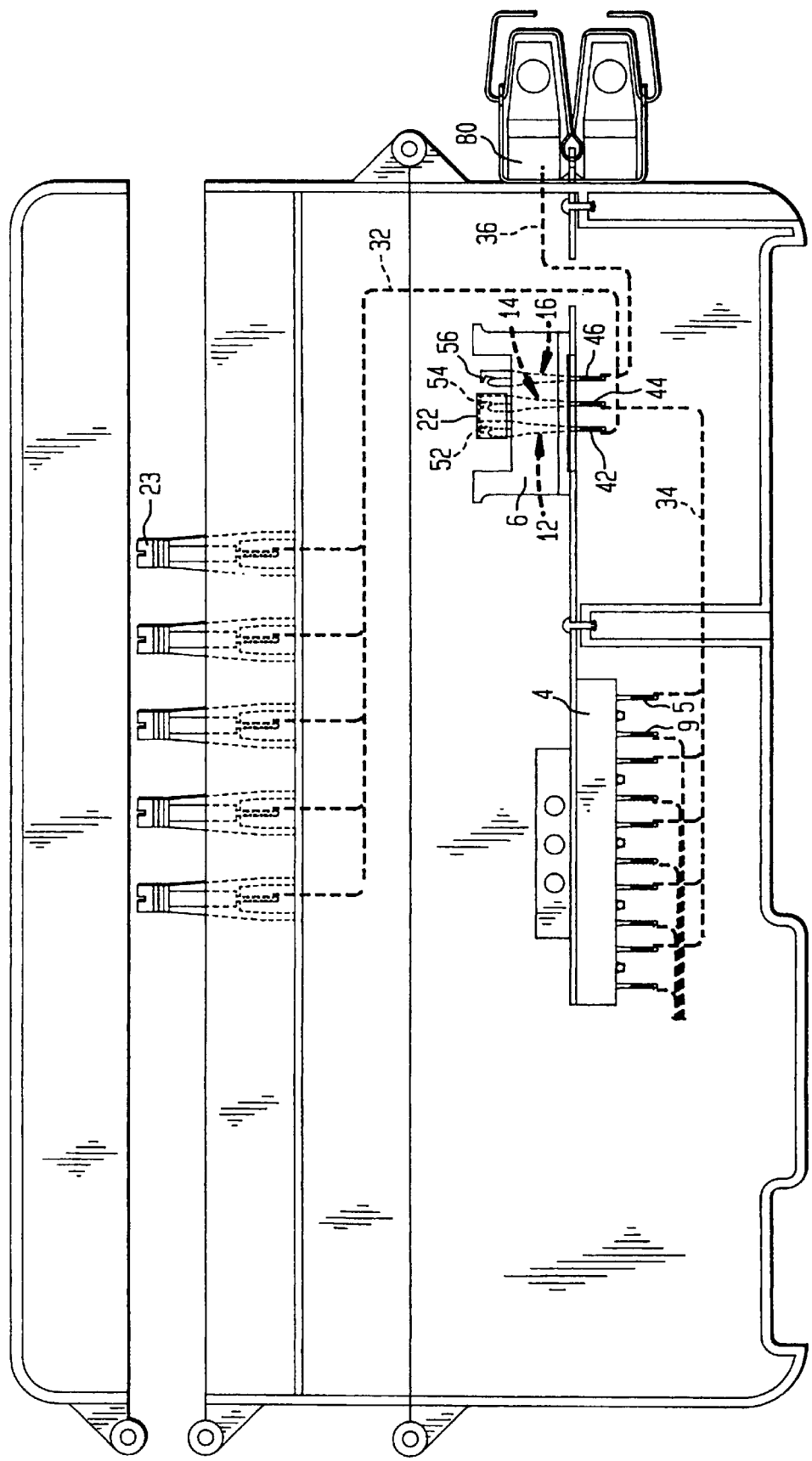
FIG. 2 is a bottom cutaway view of the connector block of FIG. 1 with an electrically established customer bridge connection.
Figure 3:
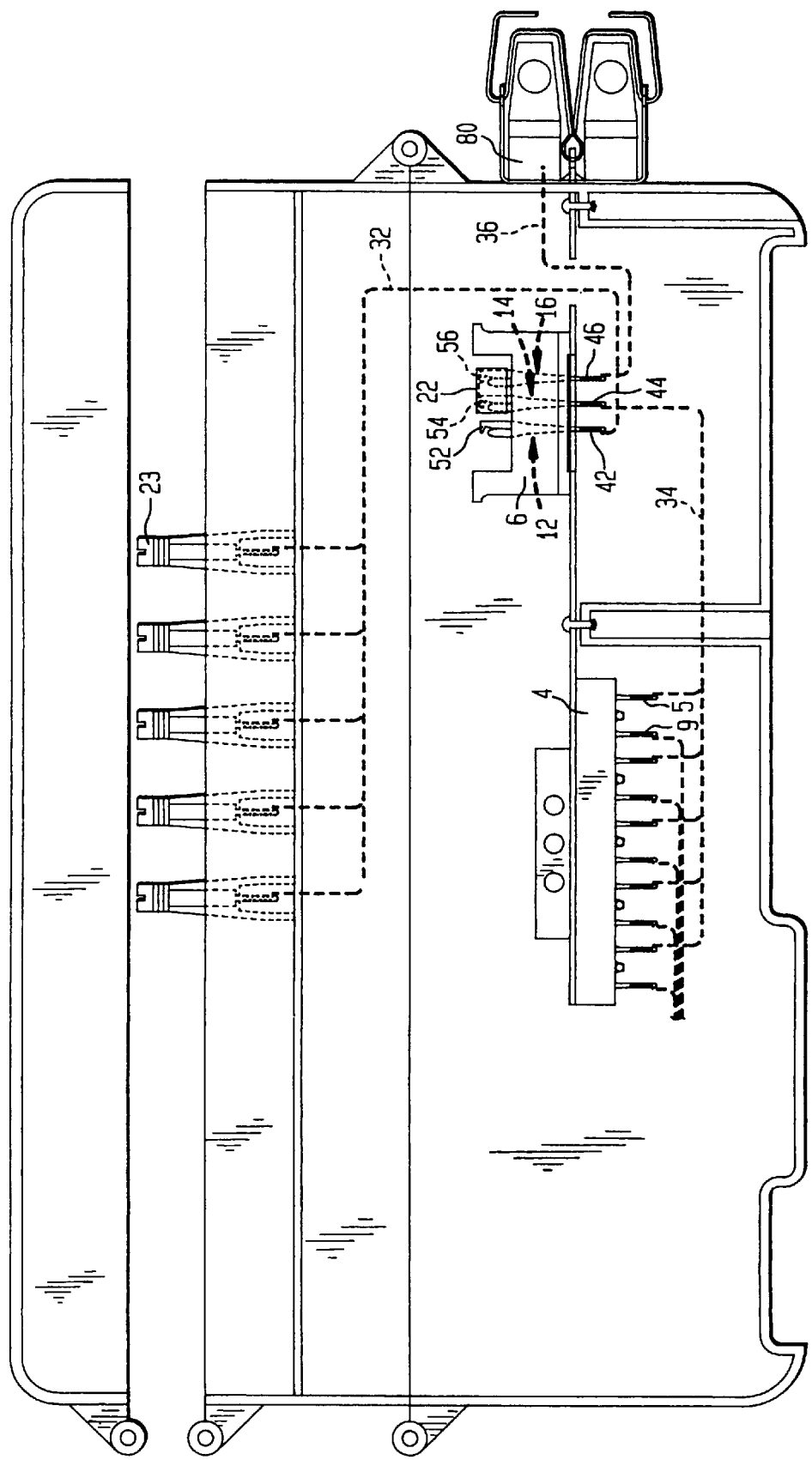
FIG. 3 is a bottom view of the connector block of FIG. 1 with an electrically established RJ21 connection.

Reference is now made to FIGS. 2 and 3 which show that each terminal strip 12 in the first column has a first wire wrap terminal 42 at one end and a first output connector 52 at the opposite end, configured as a conventional punch down insulation displacement terminal (IDC) type connector. First wire wrap terminal 42 and first output connector 52 are electrically connected to each other, preferably being formed as two ends of a unitary terminal strip in the manner of a conventional 66-type terminal strip. Each terminal strip 14 in the second column has a second wire wrap terminal 44 at one end and a second output connector 54 at the opposite end, as discussed previously in connection with terminal strip 12. Second wire wrap terminal 44 and second output connector 54 are electrically connected to each other, also as described relative to terminal strip 12. Similarly, each terminal strip 16 in the third column has a third wire wrap terminal 46 at one end and a third output connector 56 at the opposite end which are electrically connected to each other, as described above.

Reference is made again to FIGS. 2 and 3 which show that first output connector 52 of first terminal strip 12 is, connected to a desired output point, in this case, by way of non-limiting example, a customer bridge 23 which may contain an RJ11 connection (not shown), via a wire 32 connected to first wire wrap terminal 42. Third output connector 56 of third terminal strip 16 is electrically connected to a second output point, in this case, by way of non-limiting example, an RJ21 connector 80 via a wire 36 connected to third wire wrap terminal 46. Second wire wrap terminal 44 of second terminal strip 14 is electrically connected to an input point, in this case, by way of non-limiting example, a protector field 4 via a wired protector field connection 34. Each row of connector block 6 is similar in design to the other rows. Thus, the connections of first output connectors 52 and third output connectors 56 are the same for all 25 pairs of rows of connector block 6.

In accordance with the invention, to selectively route an input to a selected one of two possible output points, a bridging clip 22 may be selectively positioned to electrically connect second output connector 54 to either first output connector 52 or third output connector 56. Thus, as described and depicted in the exemplary embodiment described above and with reference to FIGS. 1, 2 and 3, an individual row on connector block 6 may have a connection to customer bridge 32 if bridging clip 22 is placed over first output connector 52 and second output connector 54 (FIG. 2), or a connection to RJ21 connector 80 if bridging clip 22 is placed over third output connector 56 and second output connector 54 (FIG. 3). Placing bridging clip 22 over first output connector 52 and second output connector 54 establishes an electrical connection between second wire wrap terminal 44 and first output connector 52. Similarly, placing bridging clip 22 over third output connector 56 and second output connector 54 establishes an electrical connection between second wire wrap terminal 44 and third output connector 56. Thus, in the exemplary embodiment, the bridging clip 22 establishes a connection from the wire originating at the telephone central office to one of two output points without the need to manually perform any wiring operations. Bridging clip 22 can be made of any conducting material, as is known in the art.

For special telephone lines such as pay phones and switching lines, the connection from the central office may be terminated directly on connector block 6 by a special wired connection 38 as shown in FIG. 1. This can be done by wiring a tip or ring wire pair directly to the IDC connector on terminal strip 14. In this case, access is denied to end users and the line can only be accessed by telephone company technicians with access to the connector block.

As illustrated in FIG. 2, the tip ring wire pair from the central office is connected to an input protector wire wrap terminal 9 located on protector field 4. Input wire wrap terminal 9 is electrically connected to output wire wrap terminal 5 within protector field 4. Output wire wrap terminal 5 is then connected to second wire wrap terminal 44 of terminal strip 14 on connector block 6 with second wire wrap terminal 44 being electrically connected to second output connector 54. Placing bridging clip 22 to cover and electrically connect first output connector 52 and second output connector 54 establishes an electrical connection between second wire wrap terminal 44 and first wire wrap terminal 42. First wire wrap terminal 42 is electrically connected to RJ11 connection 32 which is further connected to a customer bridge connector 23. Customer bridge connector 23 is a single line network interface device (NID). Thus, placing bridging clip 22 over first output connector 52 and second output connector 54 establishes an electrical connection between a tip ring wire pair from the central office and customer bridge connector 23.

Similarly, as illustrated in FIG. 3, the tip ring wire pair from the central office is connected to protector field 4 and connector block 6 as described above in FIG. 2. Placing bridging clip 22 to cover and electrically connect third output connector 56 and second output connector 54 establishes an electrical connection between second wire wrap terminal 44 and third wire wrap terminal 46. Third wire wrap terminal 46 is electrically connected to RJ21 connection 36 which may be further connected to a multi-line network interface device in a manner known in the art. Thus, placing bridging clip 22 over third output connector 56 and second output connector 54 establishes an electrical connection between a tip ring wire pair from the central office and a multi-line network interface device.

Each tip or ring row of terminal strips disposed on connector block 6 may have its own bridging clip 22. Bridging clip 22 may provide an electrical connection from an individual row to an RJ11 connection or an RJ21 connection but not to both. In this manner, connector block 6 is being used as a switch to route input wires to selected output points. In order to change the output connection of a tip ring wire pair from an RJ11 connection to an RJ21 connection or vice versa, all a user has to do is remove bridging clip 22 from the existing position (e.g., covering first output connector 52 and second output connector 54) and place it so that it covers second output connector 54 and previously un-selected third output connector 56. No manual reconnection of wires is required, greatly reducing the time required to change the connection on connector block 6.

By providing for an easier switching mechanism for connection of an input telephone line from a central office to an output end user, the present invention eliminates the need to perform manual wiring operations each time a tip ring wire pair must be rerouted.

Of course, the person of skill will recognize that the terminal strip configuration may be modified to accommodate any of a number of terminal connector types for receiving wires at either end or at both ends of the terminal strip. Moreover, a conventional 66 type connector block can be readily modified to incorporate the present invention. Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A 66-type connector block for selectively routing wiring connections, comprising:

a first terminal strip disposed on the connector block, the first terminal strip having a first wire receiving terminal electrically connected to a first output connector, the first output connector being an insulation displacement connector;

a second terminal strip disposed on the connector block, the second terminal strip having a second wire receiving terminal electrically connected to a second output connector, the second output connector being an insulation displacement connector;

a third terminal strip disposed on the connector block, the third terminal strip having a third wire receiving terminal electrically connected to a third output connector, the third output connector being an insulation displacement connector, and the first, second, and third terminal strips positioned adjacently, the second terminal strip positioned between the first and third terminal strips; and a bridging device for selectively making an electrical connection between a selected one of the first output connector or the third output connector to the second output connector, the bridging device when in a first connection position electrically connecting the second wire receiving terminal to the first output connector and the bridging device when in a second connection position electrically connecting the second wire receiving terminal to the third output connector.

2. The connector block of claim 1, wherein the bridging device is a bridging clip.

3. The connector block of claim 1, wherein at least one of said first, said second and said third wire receiving terminals is a wire wrap terminal.

4. The connector block of claim 1, wherein at least one of said first, said second and said third output connectors is a punch down type insulation displacement connector.

5. The connector block of claim 1, wherein a tip or ring wire connection may be directly connected to and terminated at the second output connector thereby providing for selective access to the tip or ring wire connection.

6. A 66-type connector block comprising:

a first terminal strip disposed on the connector block, the first terminal strip having a first wire receiving terminal electrically connected to a first punch down type insulation displacement output connector;

a second terminal strip disposed on the connector block, the second terminal strip having a second wire receiving terminal electrically connected to a second punch down type insulation displacement output connector;

a third terminal disposed on the connector block, the third terminal strip having a third wire receiving terminal electrically connected to a third punch down type insulation displacement output connector; and a bridging clip for selectively making an electrical connection between a selected one of the first output connector or the third output connector to the second output connectors the bridging device when in a first connection position electrically connecting the second wire receiving terminal to the first output connector and the bridging device when in a second connection position electrically connecting the second wire receiving terminal to the third output connector.

7. The connector block of claim 6, wherein at least one of said first, said second and said third wire receiving terminals is a wire wrap terminal.

* * * * *